(No Model.)
C. HERING.
VARIABLE SPEED ELECTRIC MOTOR.
No. 489,709.                    Patented Jan. 10, 1893.
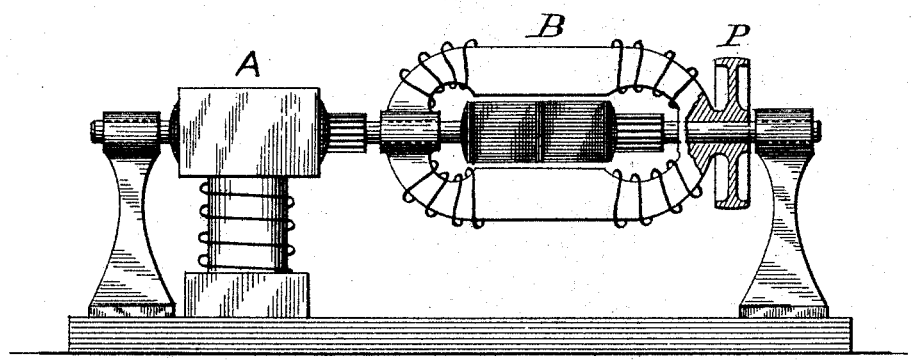
ATTEST:
J. T. Hundy
Wm. N. Capel.
INVENTOR:
Carl Hering
By H. C. Townsend
Attorney

UNITED STATES PATENT OFFICE.

CARL HERING, OF PHILADELPHIA, PENNSYLVANIA.

VARIABLE-SPEED ELECTRIC MOTOR.

SPECIFICATION forming part of Letters Patent No. 489,709, dated January 10, 1893.

Application filed April 30, 1892. Serial No. 431,306. (No model.)

*To all whom it may concern:*

Be it known that I, CARL HERING, a citizen of the United States, and a resident of Philadelphia, in the county of Philadelphia and State of Pennsylvania, have invented a certain new and useful Variable-Speed Electric Motor, of which the following is a specification.

The object of my invention is to provide a means for running an electric motor efficiently at greatly varying speeds, with increase of torque as the speed diminishes, or in other words, to obtain the equivalent of a double cone pulley for varying the speeds by purely electrical means and without great loss in the efficiency of the motor. Such a motor is especially applicable to electric railroads, elevators, cranes, &c., on which the motors are started frequently with more than their normal load and ought therefore to have even a greater torque at the starting speed. This is obtained by means of my invention.

The principle of my invention is as follows:—Suppose two similar electric motors have their revolving armature shafts coupled together, and suppose the field of the first one be stationary, while that of the second one be capable of revolving around the shaft. If the currents in the fields and armatures be regulated so that the speeds of the two armatures in their own field are absolutely the same, then there will be no tendency for the movable field to revolve; but if by regulating the field or armature currents or both, of either or of both of the motors, the speed of the armature in its field is made to differ in the two motors, the revolving field will rotate at a speed equal to the difference between the speeds of the two motors, and in a direction depending on whether the second motor is running faster or slower than the first. Furthermore, the torque of the revolving field will be very great at small speeds and will diminish as the speed increases. If, for instance, the speed of the first motor be made one thousand revolutions per minute, and that of the second be made nine hundred and ninety-nine, then the movable field will revolve once a minute; or if the speed of the second motor be made one thousand and one, its field will revolve once a minute in the opposite direction. By reversing the currents so as to tend to reverse the direction of rotation of one of the armatures, the field will revolve with a speed equal to the sum of the two speeds. By simply manipulating the currents slightly, variations of speed can be obtained in either direction between zero and the sum of the two motor speeds. The two armatures in this case simply revolve in their bearings, while the driving pulley, (or the car wheel of an electric car) of the combined motors is connected to the revolving field. The armatures may revolve continuously while the driving pulley is at rest. It is evident that the same principle may be carried out by coupling the first armature to the second field and letting the second armature drive the driving pulley, or to couple the fields and let them both revolve, while one armature is fixed and the other drives, in which latter case only one field might be used in common; but the latter does not admit of such good regulation. It is evident therefore that the terms field and armature are in general interchangeable in this description of my invention. It is evident also that instead of coupling the armatures at their shafts, they may be coupled by means of belts or other gearing, which may have a ratio of one to one, or any other; in the latter case there will be a compounding difference in the relations of the speeds.

In using the words "stationary part" I mean that that part does not revolve, but such part can of course be placed on a moving car or elevator.

In the accompanying drawing:—the figure shows in side elevation a construction that might be employed in carrying out the invention.

A, indicates the stationary motor or motor with a stationary field and B, a motor whose field and armature can both revolve. In the present instance this armature is shown coupled or connected mechanically in any desired way with the armature of A.

P, is a driving pulley or wheel to which the power of the motor is imparted, said pulley or wheel being properly connected with that one of the parts of B, that is not mechanically coupled or connected with A.

The pulley P, is merely typical of any part or device driven by the motor.

What I claim as my invention is:—

1. A duplex electric motor consisting of two electric motors both having the usual parts, namely, an armature and a field, one of which parts is fixed, two of which revolve and are mechanically coupled, and the fourth of which is capable of revolving and is connected to the work.

2. A combination of two electric motors mechanically coupled, both driven independently at different speeds by current from any suitable source, one motor being fixed, and the other capable of revolving as a whole at a speed equal to the difference (or sum) of the speeds of the two armatures in their respective fields, as and for the purpose described.

3. A combination of two electric motors, in which one motor is stationary, the other revolves as a whole and the motors are mechanically coupled, as and for the purpose specified.

4. A stationary electric motor mechanically coupled with a revolving electric motor in which both field and armature revolve, and in which the part not coupled is the driving part of the combination.

5. Two electric motors having one part in common, the other part of one motor being stationary, and that of the other motor being capable of revolving and of delivering power at variable speeds.

Signed at New York, in the county of New York and State of New York, this 29th day of April, A. D. 1892.

CARL HERING.

Witnesses:
   WM. H. CAPEL,
   THOS. F. CONREY.